United States Patent
Griffin et al.

(10) Patent No.: US 12,141,290 B2
(45) Date of Patent: Nov. 12, 2024

(54) SOURCE CODE TRUSTWORTHINESS ASSESSMENT

(71) Applicant: Microsoft Technology Licensing, LLC, Redmond, WA (US)

(72) Inventors: Daniel Carlyn Griffin, Seattle, WA (US); Anson Michael Horton, Bothell, WA (US); Ruben Josue Rios-Lopez, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 530 days.

(21) Appl. No.: 17/331,194

(22) Filed: May 26, 2021

(65) Prior Publication Data
US 2022/0382877 A1     Dec. 1, 2022

(51) Int. Cl.
*G06F 21/57*     (2013.01)
*G06F 8/75*     (2018.01)
*G06N 20/00*     (2019.01)

(52) U.S. Cl.
CPC .............. *G06F 21/577* (2013.01); *G06F 8/75* (2013.01); *G06N 20/00* (2019.01)

(58) Field of Classification Search
CPC .......... G06F 21/577; G06F 8/75; G06N 20/00
See application file for complete search history.

(56) References Cited

U.S. PATENT DOCUMENTS

| | | | | |
|---|---|---|---|---|
| 8,776,180 B2* | 7/2014 | Kumar | .................. | G06F 21/564 |
| | | | | 713/157 |
| 10,817,604 B1* | 10/2020 | Kimball | ................ | G06F 21/563 |
| 11,645,388 B1* | 5/2023 | Kimball | ................ | G06N 20/20 |
| | | | | 726/23 |
| 2018/0314517 A1* | 11/2018 | Iwanir | .................... | G06F 21/563 |
| 2021/0006543 A1 | 1/2021 | Deshpande et al. | | |
| 2021/0241273 A1* | 8/2021 | Abad | .................... | H04L 9/3239 |

OTHER PUBLICATIONS

"SUNSPOT: An Implant in the Build Process", Retrieved from: https://www.crowdstrike.com/blog/sunspot-malware-technical-analysis/, Jan. 11, 2021, 19 Pages.
Arnott, Andrew, "SecurityManager stubs return poor results", Retrieved from: https://github.com/dotnet/runtime/issues/1698, Jan. 14, 2020, 4 Pages.
Brewster, Thomas, "Google Warning: North Korean Hackers Breach Windows and Chrome Defenses To Attack Security Researchers", Retrieved from: https://www.forbes.com/sites/thomasbrewster/2021/01/26/google-warning-north-korean-hackers-breach-windows-and-chrome-defenses-to-attack-security-researchers/?sh=189d0c2447b8, Jan. 26, 2021, 5 Pages.
(Continued)

*Primary Examiner* — Luu T Pham
*Assistant Examiner* — Paul J Skwierawski
(74) *Attorney, Agent, or Firm* — Schwegman Lundberg & Woessner, P.A.

(57) ABSTRACT

A computer implemented method includes determining a first level of risk based on a context of source code as stored. A second level of risk is determined based on a change history of the source code. A third level of risk is determined by assessing a nature of changes to the source code. The first, second, and third levels of risk are combined to generate an indication of trust in the source code.

8 Claims, 4 Drawing Sheets

(56) References Cited

OTHER PUBLICATIONS

Vangel, et al., "Microsoft Defender Application Guard overview", Retrieved from: https://docs.microsoft.com/en-us/windows/security/threat-protection/microsoft-defender-application-guard/md-app-guard-overview, Jan. 27, 2021, 4 Pages.

Weins, et al., "Configure trust settings for files and folders", Retrieved from: https://docs.microsoft.com/en-us/visualstudio/ide/reference/trust-settings?view=vs-2017, Sep. 5, 2018, 5 Pages.

"International Search Report and Written Opinion Issued in PCT Application No. PCT/US22/026863", Mailed Date: Jul. 13, 2022, 10 Pages.

\* cited by examiner

SOURCE CODE TRUSTWORTHINESS ASSESSMENT

BACKGROUND

The use of open-source libraries by software developers is steadily increasing. The rate of root-code execution security exploits is also increasing. Manual code review is performed by software developers to mitigate the risk of adopting unvetted source code for their projects. However, a useful software library of typical complexity is on the order of several thousand lines of code, which is far too many for a human reviewer to conceptualize and review in sufficient detail. Even accidental security vulnerabilities frequently occur across functional and module boundaries, making the exploits even more difficult to locate via manual inspection. Still further, malicious code will be intentionally obfuscated to make manual or other identification even more difficult.

Static source code analysis tools are employed as partial mitigation to the limitations of manual analysis, but state of the art of static analysis can result in a high rate of false positives, slowing down the development process. A related challenge is that inter-procedural analysis of a moderately sized code base requires significant computational power. Practically, until an untrusted software library has been integrated with the developer's main project, too much contextual information is missing for an inter-procedural scan to be effective.

Finally, anti-virus scanners are additionally used to mitigate known-bad patterns in stored files, they are generally tuned for binary analysis, rather than for text-based source code and scripts. Also, anti-virus scanners don't have access to application and project level contextual information. Anti-virus scanners are also often disabled on source code assets for performance reasons.

SUMMARY

A computer implemented method includes determining a first level of risk based on a context of source code as stored. A second level of risk is determined based on a change history of the source code. A third level of risk is determined by assessing a nature of changes to the source code. The first, second, and third levels of risk are combined to generate an indication of trust in the source code.

DETAILED DESCRIPTION

Figure 1:
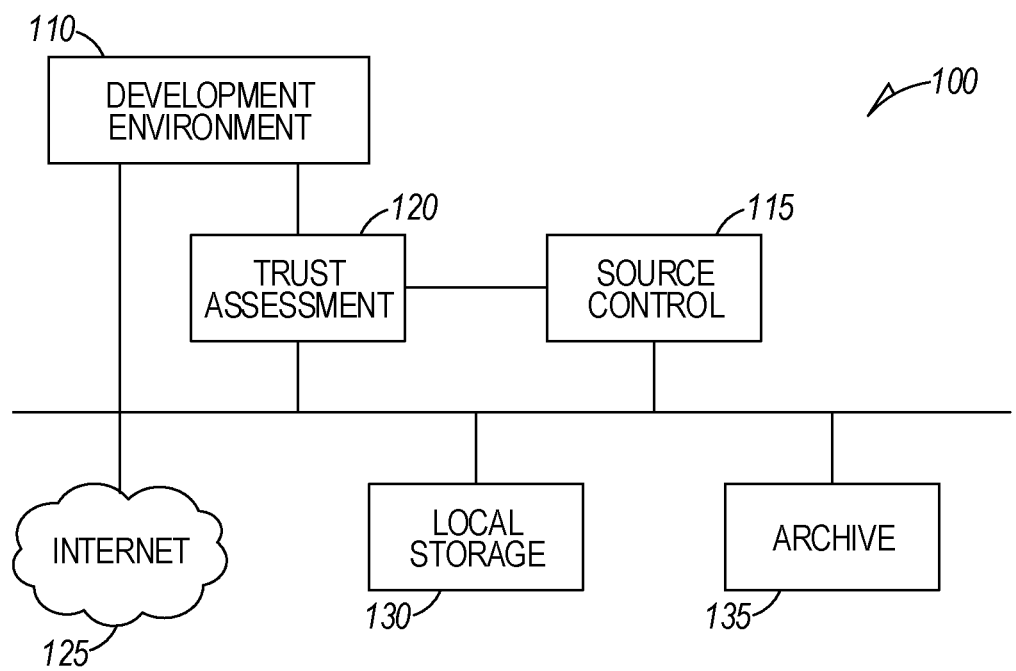
FIG. 1 is a block functional diagram illustrating an example trustworthiness assessment system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

To mitigate the risk of adopting unvetted source code in software development projects, trustworthiness of source code to be adopted is progressively assessed. Open-source code may be developed by many different people, some of whom may be more interested in security exploits than providing safe, useable code.

A variety of signals are aggregated to continuously rate content trustworthiness. A confidence level for ratings may also be assessed. Source code herein is referred to as content, and includes pre-compilation source modules, scripts, markup documents, project metadata files, or other information regarding the source code that may be relevant to its trustworthiness.

Trustworthiness assessment starts with the context of the content as stored. For example, content in source control (a controlled storage for tracking and managing changes to code), on the internet, a local network file share, or a compressed archive may have different associated risks. Each storage type conveys a level of risk correlated to such considerations as whether the content is likely to be actively maintained or have undergone tampering in a way that is difficult to detect.

The trustworthiness assessment also gathers and uses signals that are specific to the storage type. For example, content in source control will have change history which indicates how recently maintenance was performed, and to what extent. Change history also indicates the number, and identity, of contributors. The presence of contributors with a high-level of reputation conveys more trust than the lack thereof. By analyzing change history comments, the trustworthiness assessment further assesses the nature of the changes. For example, the change comments may indicate carelessness, security patches, or a pattern of confusion, which can signify greater risk.

An example of content used to illustrate various aspects of trustworthiness assessment is OpenSSL. OpenSSL is a public open-source Toolkit for Transport Layer Security (TLS) protocol formerly known as the Secure Sockets Layer (SSL) protocol. The protocol implementation is based on a full-strength general purpose cryptographic library, which can also be used stand-alone. OpenSSL is available via the Internet and includes many files containing executable code as well as documents listing a full history of contributors to the code.

A system for content trustworthiness assessment provides a sophisticated assessment of content trust before a software developer user has begun interacting with the content. An assessment of trustworthiness may be provided to the user at a moderate level of confidence, referred to as a trustworthiness score. Based on this assessment, the user may determine that the content, such as a library, in question poses too much risk and should therefore be avoided in favor of continuing the search for an alternative. Additionally, an organization may choose to disallow consumption of any assets with a trustworthiness score below a certain threshold without an exception.

The trustworthiness may be sufficiently high that adoption of the content is still worth considering. Based on the specific risk signals flagged by the trustworthiness assessment, the user may decide to invest time in mitigating the identified risks to increase trustworthiness before continuing to use the content. Such mitigation may be worth the additional effort if there are few if any compelling alternatives to adoption of the content, even while it presents too much risk to be used as-is.

The trustworthiness assessment may continue as the user creates a personal copy of the content and deepens their interaction with it. The interaction usually, eventually, consists of some level of manual inspection. In parallel, context-aware static analysis and anti-virus scanning may be performed.

The trustworthiness score is adapted accordingly as the manual assessment being performed by the user continues. At any point, the user may decide to abandon the investigation based on low trust or may decide to proceed with riskier steps such as compilation and execution. For compiled content, additional trustworthiness signals include emitted warnings and compiler-integrated static analyzers.

For open-source libraries, execution may begin with unit tests and continue with sample programs. The runtime behavior of the content may also be assessed for risk factors such as file I/O, initiating outbound network traffic, and listening on inbound network ports. While malicious content is likely to have done its damage by this point, a high-level of risk determined by the runtime assessment will help ensure that the investigation pauses, and the attack doesn't spread.

FIG. 1 is a block functional diagram illustrating an example trustworthiness assessment system 100. System 100 includes a development environment 110 for use by software developer users to generate computer programs. Example development environments include Visual Studio and VS Code. Many others may be used in further examples.

The generated computer programs may be stored in a source control 115. Example source control 115 includes Azure DevOps and GitHub to name a few. Code from many users may be stored in source control 115. Source control 115 is a controlled storage for tracking and managing changes to code. A rich software change history may be included for all code in source control 115.

A trust assessment function 120 may plug into the source control 115 and is used to assess the risk of code obtained from many different sources that may be accessed, such as source control 115 itself, the internet 125, local storage 130, archive storage 135, and other sources. The trust assessment function 120 is also coupled to interface with the development environment 110 to provide assessment of code, such as open-source code, that users desire to use in the code they are developing.

Content may be obtained from many different sources that include a storage medium. Trust assessment function 120 may be used to determine the storage medium or storage media where the content, such as a software asset, originated from or is otherwise available. For example, the storage medium may be a network file share via internet 125.

Figure 2:
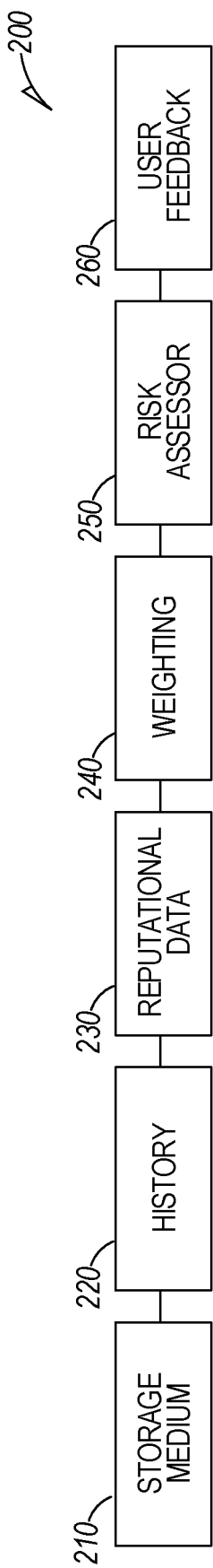
FIG. 2 is a component diagram illustrating components of a trust assessment function according to an example embodiment.

FIG. 2 is a component diagram illustrating components of the trust assessment function 120 generally at 200. The components include a storage medium component 210, history component 220, reputational data component 230, weight component 240, risk assessor component 250 and user feedback component 260. While specific components are labeled, the functions described as associated with each component may be performed by any one or combination of the components.

The trust assessment function 120 aggregates input signals multidimensionally, not only along the flow between source control 115 and a source code editor in the development environment 110, but also historical data from source control 115, reputational data from contributors, and contextual data from the content type and how it's being used.

Information regarding the storage medium that may be relevant to determining the trustworthiness of the content is processed by storage medium component 210.

If previous versions of the software source code are available, the system 100 analyzes what changes have been made to it via the trust assessment function 120 utilizing the history component 220.

The history component 220 retrieves historical data for a person, account name, social media persona, or software asset. Historical data are retrieved in various ways depending on the asset type and on the input from the storage medium component. For a software asset, a storage media map to historical data enables the history component to perform one or more of the following.

For content, such as a software asset obtained via a network file share, backup or alternative copies available for the software asset may allow comparing the newer version to prior versions.

For a compressed archive, the history component 220 may check if previous versions of the archive are available for comparison. Some source control repositories allow an archive to be downloaded (i.e., as an alternative to the individual files). In this case, the system 100 attempts to retrieve older versions of the archive from the source control 115.

Source control 115 is likely to be the richest source for obtaining software change history unless the repository is new. If at least one historical version of the software asset is located, the history component may perform an analysis of the changes that have been made. For each version pair, the following processing is applied by the history component 220:

1. Compute "Chidamber and Kemerer Metrics" for the two generational versions. In addition to determining the complexity of the latest version, which is a risk factor, this allows the history component 220 to determine if the software is getting more complex over time.
2. Run the two software versions through static analysis and compare the results. This allows the history component 202 to identify improvements or regressions in quality.

For changes obtained from source control, the history component 220 may analyzes the text of comments, if any, associated with the change. The following signals are obtained:

1. References to Common Vulnerability Enumeration records, e.g., "CVE- . . . "
2. Software security-impacting keywords including overflow, overwrite, underwrite, security, vulnerability, exploit, disclosure, privilege, and execution.
3. Previous contributors to the software library, including full name and account names where available. These are discussed in the next section.

Finally, the history component 220 tallies the number of contributors and the number of changes that have occurred over time.

For a private network account name, the history component 220 checks whether the identity is associated with a single person, a group of people, or a non-human interactor. History component 220 then determines whether the entity is still present. Examples of a still present entity includes for example, still employed versus having left the company and still active versus decommissioned. For a human interactor, the history component determines the person's seniority based on human resources data. This enables mapping of the account name to a full name and linking this set of data in the following ways.

For a person's full name, if in a corporate or private network environment, the history component 220 performs a similar search to the above except in reverse. That is, it maps the full name to one or more network account names based on human resources data as well as group memberships. Full name searches are also performed on the internet in attempt to associate the individual with one or more online accounts.

For an online account names (in tandem with the person's full name, above), our system searches social media for relevant professional history. This includes previous positions and job titles, previous contributions to the software asset in question, and contributions over time to other open-source software.

The reputational data component 230 gathers signals relating to the reputation of a person or asset. This is done by accepting the output of the history component 220 and performing a qualitative assessment of the various signals. One qualitative assessment is based on the nature and number of contributions made to the software library in question utilizing complexity and change description generated by the history component 220.

Referring again to the OpenSSL software library as an example, there is a long history of active contribution. The number of contributors over the twenty-three-year history of the project exceeds 500. One top contributor is identified by name. That top contributor is active on social media and at industry events. The system will look at the change history of the content, find each contributor, and weight their social media presence.

An additional qualitative assessment is performed for other software libraries that the individual has touched. A further qualitative assessment is performed based on a sentiment analysis of online writings and social media posts. The sentiment analysis may be performed using existing commercially available sentiment analysis services and tools.

The change history of the content may be assessed more deeply. OpenSSL, for example, has had approximately 200 security vulnerabilities over its history. The vulnerabilities are noted with the content: OpenSSL:CVE security vulnerabilities, versions and detailed reports (cvedetails.com). The per-year vulnerability count for OpenSSL peaked from 2014-2016, the three years following a well-known security exploit referred to as the Heartbleed incident. The system 100 will note that peek in a couple of ways: first, that the use of any version of that library from that time, or before, would be highly risky. Second, that the multiyear downward trend in vulnerabilities since that time is promising.

As an example of digging deeper into the changes, system 100 would also note from the Heartbleed patch in 2014 which block of code caused the issue:

commit 96db9023b881d7cd9f379b0c154650d6c108e9a3
Author: (Name 1) (email 1)
Date: Sun Apr 6 00:51:06 2014+0100
    Add heartbeat extension bounds check.
    A missing bounds check in the handling of the TLS heartbeat extension can be used to reveal up to 64k of memory to a connected client or server.
    Thanks for (Name of person) of (Name of company) Security for discovering this bug and to (Name of person) (email) and (Name of person) (email) for preparing the fix (CVE-2014-0160)

Working backward, that block was introduced in 2011. The system 100 will look for similar patterns as well as other contributions by that same user/author to further modify the risk assessment. For example:

commit 4817504d069b4c5082161b02a22116ad75f822b1
Author: (Name 1) (email 1)
Date: Sat Dec 31 22:59:57 2011+0000

PR: 2658
Submitted by: (Name of person) (email)
Reviewed by: (Name of person)
Support for TLS/DTLS heartbeats.

Figure 3:
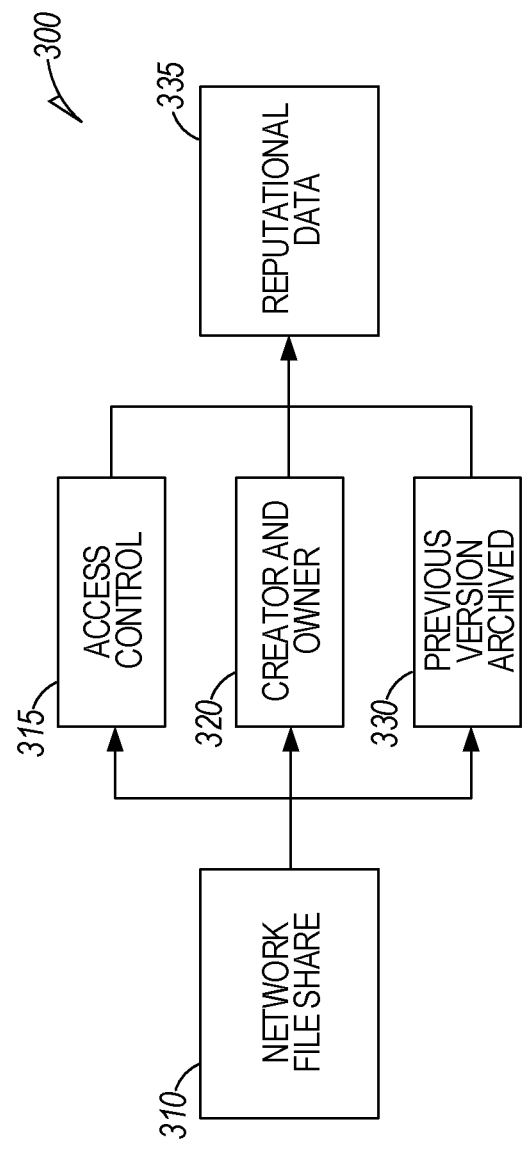
FIG. 3 is a flow diagram illustrating some of the metadata used to generate reputational data according to an example embodiment.

FIG. 3 is a flow diagram 300 illustrating some of the metadata used to generate reputational data. In one example, the source of the content may be a network file share server 310. Metadata derived may include information about the server and content obtained, such as what are the access controls at 315, who is the creator and owner of the server and/or content at 320, and information regarding previous versions that are archived at 330. The collected information is combined into reputational data at 335.

If the content is source code that is distributed from a network folder via file share 310, the degree of write-access granted to that network location is a determining factor for the risk of malicious (or accidental) modification that may have occurred while the source code has been stored there.

The access control 315, identity, or identities, of the creator, and owner 320 of the network folder or source code archive 330 are fed into the trust assessment function 120 to generate the reputational data 335.

The weight component turns the above signals into weighted values that can then be empirically compared. In one example, generation of the weighted values is performed using a manually generated lookup table for each of the signals described in the previous sections. In a further example, a trained machine learning model may be used to determine and continuously tweak the weighting of each signal based on a training set. The training set can include multiple examples of content and the associated information described above. Each such example may be labeled with an indication identifying whether the example contains an exploit.

The risk assessor component 250 translates the weighted trustworthiness signals from the weighting component 240 into a human-readable risk value. Like the weighting component 240, a lookup table for each of the risk values may be used for providing risk descriptions. The risk descriptions for the lookup table may be manually generated. In further examples, an algorithmic classifier may be used to provide risk values from the weighted trustworthiness signals.

In one example, the risk assessor component 250 analyzes compile and runtime behavior of the software asset content. This analysis may be selected by a user. This is a tradeoff from the user perspective, since executing an untrusted software component is where the most risk is incurred. However, eventually, the investigation of any software asset must proceed to that point before a final decision is made to adopt it for production use.

In one example, compile-time signals are generated when the software asset, or any of its modules, is interpreted, compiled, assembled, and/or linked, as applicable. The compile-time signals include tool warnings and errors, memory section layout, and references to other libraries and imports.

Runtime signals are gathered when the software asset is executed in any way, including in the context of unit tests and sample programs. Runtime signals include CPU usage, memory footprint, inter-process communication, and disk and network I/O.

The user feedback component gathers response data from the user and feed it back into the system. This is partly done implicitly as the user interacts more deeply with the software asset by compiling it and running tests via the risk assessor component 250.

The user may also make changes to the software during this investigatory phase to reduce risk. Examples including fixing compiler and static analysis warnings and reducing network I/O. The system responds in real-time to these changes, guiding the user to make the most efficient use of time.

Figure 4:
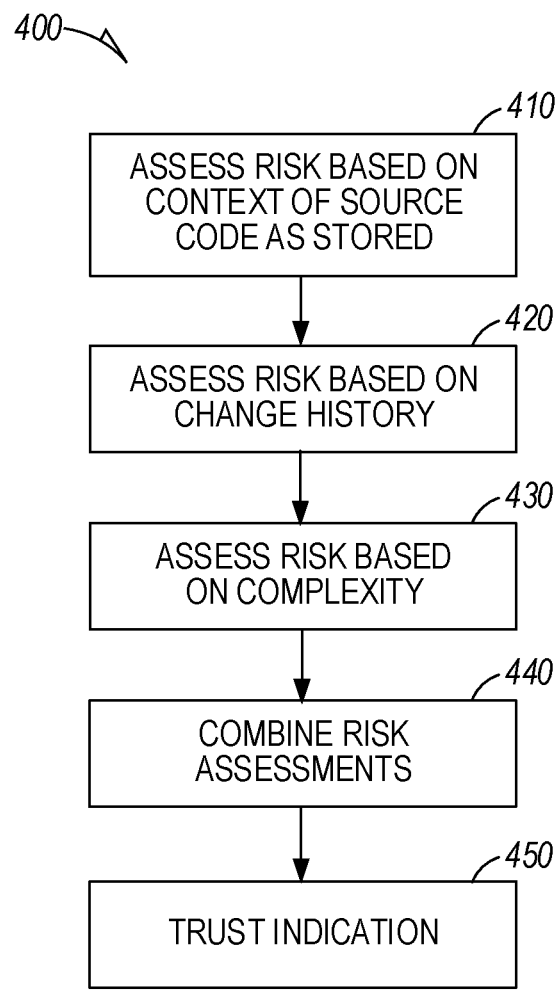
FIG. 4 is a flowchart of a computer implemented method of performing trust assessment for content for use in software development according to an example embodiment.

FIG. 4 is a flowchart of a computer implemented method 400 of performing trust assessment for content for use in software development. Once a developer identifies source code for which a trust assessment is to be performed, method 400 begins at operation 410 by determining a first level of risk based on a context of source code as stored. The context of source code may include a provenance of the source code. The provenance is calculated based on the storage medium from which the source code is obtained, such as whether the source code is from a trusted source like a control store, or from a server on the Internet, local storage, or an archive.

In some examples, the provenance also includes an assessment based on reputational data. Such reputational data may include an analysis of persons contributing to the source code based on an account name, social media persona, or other factors related to the reputation of those that contributed to the source code.

At operation 420, a second level of risk is determined based on a change history of the source code. The change history of the source code may be obtained from the storage medium, such as control store, and may include data for a person, account name, social media persona, or software asset. Historical data are retrieved in various ways depending on the asset type and on the input from the storage medium component. For a software asset, a storage media map to historical data enables the history component to compare copies to prior versions. If at least one historical version of the software asset is located, the history component may perform an analysis of the changes that have been made.

Operation 430 assesses a nature of changes to the source code to determine a third level of risk. The nature of changes may be used to determine the complexity of the source code. A static analysis of versions can be used to compare results to determine improvements or regressions in quality.

Operation 440 combines the first, second, and third levels of risk to generate an indication 450 of trust in the source code. The levels of risk may be in the form of weighted values that can then be empirically compared to generate a risk assessment. In one example, generation of the weighted values is performed using a manually generated lookup table for each of the signals described in the previous sections. In a further example, a trained machine learning model may be used to determine and continuously tweak the weighting of each signal based on a training set. The training set can include multiple examples of content and the associated information described above. Each such example may be labeled with an indication identifying whether the example contains an exploit.

Reference to known vulnerabilities in the source code may also be identified. Similarly, keywords may be searched for in the source code to determine security-impacting words.

In one example, the weighted values represent trustworthiness signals that can be converted into a human-readable risk value. A lookup table for each of the risk values may be used for providing risk descriptions. The risk descriptions for the lookup table may be manually generated. In further examples, an algorithmic classifier may be used to provide risk values from the weighted trustworthiness signals.

Figure 5:
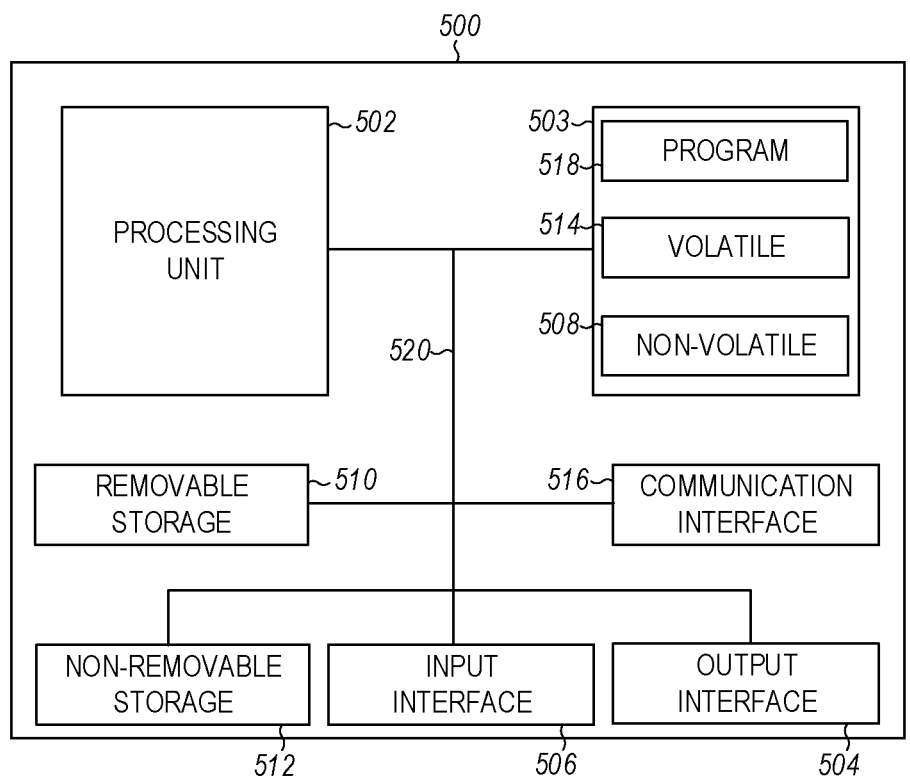
FIG. 5 is a block schematic diagram of a computer system to implement one or more example embodiments.

FIG. 5 is a block schematic diagram of a computer system 500 to assess the risk of source code for use in developing software and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

Examples

1. A computer implemented method includes determining a first level of risk based on a context of source code as stored, determining a second level of risk based on a change history of the source code, assessing a nature of changes to the source code to determine a third level of risk, and combining the first, second, and third levels of risk to generate an indication of trust in the source code.
2. The method of claim 1 wherein the first level of risk is determined as a function of a storage location from which the source code is obtained.
3. The method of claim 2 wherein the storage location comprises a control store, a server coupled to a public network, local storage, or an archive.
4. The method of claim 3 wherein the first level of risk is lower for a control store and higher for a server coupled to the public network.
5. The method of any of claims 1-4 wherein determining a second level of risk comprises comparing copies of the source code from the change history of the source to identify contributors to the source code.
6. The method of claim 5 and further comprising determining the second level of risk as a function of reputational data derived from an analysis of the contributors to the source code.
7. The method of claim 6 wherein the analysis of persons contributing to the source code includes utilizing an account name for the person and social media persona.
8. The method of any of claims 1-7 wherein determining the third level of risk comprises determining a complexity of the source code.
9. The method of claim 8 wherein determining the complexity of the source code comprises performing a static analysis to determine improvements or regressions in quality of the source code.
10. The method of any of claims 1-9 wherein the first, second, and third levels of risk are in the form of weighted values that are empirically compared to generate a risk assessment comprising the level of trust.
11. The method of claim 10 wherein the weighted values are determined using a lookup table or a trained machine learning model trained on multiple examples of source code and labeled associated levels of risk.
12. A machine-readable storage device has instructions for execution by a processor of a machine to cause the processor to perform operations to perform a method. The operations include determining a first level of risk based on a context of source code as stored, determining a second level of risk based on a change history of the source code, assessing a nature of changes to the source code to determine a third level of risk, and combining the first, second, and third levels of risk to generate an indication of trust in the source code.
13. The device of claim 12 wherein the first level of risk is determined as a function of a storage location from which the source code is obtained, wherein the storage location comprises a control store, a server coupled to a public network, local storage, or an archive, and wherein the first level of risk is lower for a control store and higher for a server coupled to the public network.

14. The device of any of claims 12-13 wherein determining a second level of risk comprises comparing copies of the source code from the change history of the source to identify contributors to the source code.

15. The device of claim 14 and further comprising determining the second level of risk as a function of reputational data derived from an analysis of the contributors to the source code wherein the analysis of persons contributing to the source code includes utilizing an account name for the person and social media persona.

16. The device of any of claims 12-15 wherein determining the third level of risk comprises determining a complexity of the source code by performing a static analysis to determine improvements or regressions in quality of the source code.

17. The device of any of claims 12-16 wherein the first, second, and third levels of risk are in the form of weighted values that are empirically compared to generate a risk assessment comprising the level of trust.

18. The device of any of claims 12-17 wherein the weighted values are determined using a lookup table or a trained machine learning model trained on multiple examples of source code and labeled associated levels of risk.

19. A device includes a processor and a memory device coupled to the processor and having a program stored thereon for execution by the processor to perform operations. The operations include determining a first level of risk based on a context of source code as stored, determining a second level of risk based on a change history of the source code, assessing a nature of changes to the source code to determine a third level of risk, and combining the first, second, and third levels of risk to generate an indication of trust in the source code.

20. The device of claim 19 wherein the first level of risk is determined as a function of a storage location from which the source code is obtained, wherein the storage location comprises a control store, a server coupled to a public network, local storage, or an archive, and wherein the first level of risk is lower for a control store and higher for a server coupled to the public network, determining a second level of risk comprises comparing copies of the source code from the history of the source to identify contributors to the source code, and determining the third level of risk comprises determining a complexity of the source code by performing a static analysis to determine improvements or regressions in quality of the source code, wherein the first, second, and third levels of risk are in the form of weighted values that are empirically compared to generate a risk assessment comprising the level of trust.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
identifying existing open source source code to be added to a software development project;
determining a first level of risk based on a storage location context from which the source code is identified, wherein the first level of risk is determined as a function of a storage location from which the source code is obtained, wherein the storage location comprises a control store, a server coupled to a public network, local storage, or an archive, and wherein the first level of risk is lower for a control store and higher for a server coupled to the public network;
determining a second level of risk based on a change history of the source code, including reputation of contributors to the source code, wherein determining the second level of risk comprises comparing copies of the source code from the change history of the source to identify contributors to the source code;
assessing a nature of changes to the source code to determine a third level of risk, wherein determining the third level of risk comprises determining a complexity of the source code by performing a static analysis to determine improvements or regressions in quality of the source code;
combining the first, second, and third levels of risk to generate an indication of trust in the source code, wherein the first, second, and third levels of risk are in the form of weighted values that are empirically compared to generate a risk assessment comprising the level of trust;
comparing the indication of trust to a trust threshold prior to use of the source code in the development project; and
disallowing use of the source code in the software development project in response to the indication of trust being below the trust threshold.

2. The method of claim 1 and further comprising determining the second level of risk as a function of reputational data derived from an analysis of the contributors to the source code.

3. The method of claim 2 wherein the analysis of persons contributing to the source code includes utilizing an account name for the person and social media persona.

4. The method of claim 1 wherein the weighted values are determined using a lookup table or a trained machine learning model trained on multiple examples of source code and labeled associated levels of risk.

5. A machine-readable storage device having instructions for execution by a processor of a machine to cause the processor to perform operations to perform a method, the operations comprising:
identifying existing open source source code to be added to a software development project;
determining a first level of risk based on a storage location context from which the source code is identified, wherein the first level of risk is determined as a function of a storage location from which the source code is obtained, wherein the storage location comprises a control store, a server coupled to a public network, local storage, or an archive, and wherein the first level of risk is lower for a control store and higher for a server coupled to the public network;
determining a second level of risk based on a change history of the source code, including reputation of contributors to the source code, wherein determining the second level of risk comprises comparing copies of the source code from the change history of the source to identify contributors to the source code;
assessing a nature of changes to the source code to determine a third level of risk, wherein determining the third level of risk comprises determining a complexity of the source code by performing a static analysis to determine improvements or regressions in quality of the source code;

combining the first, second, and third levels of risk to generate an indication of trust in the source code, wherein the first, second, and third levels of risk are in the form of weighted values that are empirically compared to generate a risk assessment comprising the level of trust;

comparing the indication of trust to a trust threshold prior to use of the source code in the development project; and disallowing use of the source code in the software development project in response to the indication of trust being below the trust threshold.

6. The device of claim 5 and further comprising determining the second level of risk as a function of reputational data derived from an analysis of the contributors to the source code wherein the analysis of persons contributing to the source code includes utilizing an account name for the person and social media persona.

7. The device of claim 5 wherein the weighted values are determined using a lookup table or a trained machine learning model trained on multiple examples of source code and labeled associated levels of risk.

8. A device comprising:

a processor; and a memory device coupled to the processor and having a program stored thereon for execution by the processor to perform operations comprising:

identifying existing open source source code to be added to a software development project;

determining a first level of risk based on a storage location context from which the source code is identified, wherein the first level of risk is determined as a function of a storage location from which the source code is obtained, wherein the storage location comprises a control store, a server coupled to a public network, local storage, or an archive, and wherein the first level of risk is lower for a control store and higher for a server coupled to the public network;

determining a second level of risk based on a change history of the source code, including reputation of contributors to the source code, wherein determining the second level of risk comprises comparing copies of the source code from the change history of the source to identify contributors to the source code;

assessing a nature of changes to the source code to determine a third level of risk, wherein determining the third level of risk comprises determining a complexity of the source code by performing a static analysis to determine improvements or regressions in quality of the source code;

combining the first, second, and third levels of risk to generate an indication of trust in the source code, wherein the first, second, and third levels of risk are in the form of weighted values that are empirically compared to generate a risk assessment comprising the level of trust;

comparing the indication of trust to a trust threshold prior to use of the source code in the development project; and disallowing use of the source code in the software development project in response to the indication of trust being below the trust threshold.

\* \* \* \* \*